United States Patent
Zhao et al.

(10) Patent No.: US 12,360,745 B2
(45) Date of Patent: Jul. 15, 2025

(54) PERFORMING CODE COMPLETION USING DATA FLOW

(71) Applicant: International Business Machines Corporation, Armonk, NY (US)

(72) Inventors: Wenting Zhao, Ithaca, NY (US); Ibrahim Abdelaziz, Tarrytown, NY (US); Julian Timothy Dolby, Bronx, NY (US); Kavitha Srinivas, Port Chester, NY (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 17/964,961

(22) Filed: Oct. 13, 2022

(65) Prior Publication Data

US 2024/0126513 A1 Apr. 18, 2024

(51) Int. Cl.
*G06F 8/33* (2018.01)
*G06F 8/36* (2018.01)
*G06N 5/04* (2023.01)

(52) U.S. Cl.
CPC ............... *G06F 8/33* (2013.01); *G06F 8/36* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 9,928,040 B2 * | 3/2018 | Tarlow | G06F 11/3604 |
| 10,628,130 B2 | 4/2020 | Fu | |
| 10,956,579 B2 | 3/2021 | Youngberg | |
| 11,568,055 B2 | 1/2023 | Olson | |
| 11,604,883 B2 | 3/2023 | Bhalla | |
| 11,693,637 B1 * | 7/2023 | Singh | G06F 8/436 717/139 |
| 2018/0089064 A1 * | 3/2018 | Duer | G06F 11/3698 |
| 2020/0097261 A1 * | 3/2020 | Smith | G06F 40/174 |
| 2021/0034335 A1 | 2/2021 | Svyatkovskiy | |
| 2021/0279042 A1 | 9/2021 | Allamanis | |
| 2021/0357187 A1 * | 11/2021 | Clement | G06F 8/35 |
| 2021/0357193 A9 | 11/2021 | Fu | |
| 2022/0300835 A1 * | 9/2022 | Ghosh | G06F 8/10 |

FOREIGN PATENT DOCUMENTS

| | | |
|---|---|---|
| CN | 112527273 A | 3/2021 |
| CN | 113064586 A | 7/2021 |

OTHER PUBLICATIONS

Barath, "Improving Code Completion with Machine Learning", 2020, Imperial College London (Year: 2020).*

(Continued)

*Primary Examiner* — Hossain M Morshed
(74) *Attorney, Agent, or Firm* — Stosch Sabo; Otterstedt & Kammer PLLC

(57) ABSTRACT

A corpus of source code from a code database is accessed and a language prediction model is trained based on the corpus of source code. A given program is accessed and a completion of a given line of the given program is predicted by performing inferencing using the language prediction model and at least a portion of the given program. The given line is completed based upon the prediction.

20 Claims, 17 Drawing Sheets

(56) References Cited

OTHER PUBLICATIONS

Peter Mell and Timothy Grance, The NIST Definition of Cloud Computing, NIST Special Publication 800-145, Sep. 2011, cover, pages i-iii and 1-3.
Michael Hicks. The Programming Languages Enthusiast. Oct. 23, 2017, pp. 14.
Eclipse (software). Downloaded from https://en.wikipedia.org/wiki/Eclipse_(software) Oct. 3, 2022. pp. 15.
In Defense of Soundiness: A Manifesto. Article in Communications of the ACM . Jan. 2015. pp. 4.
Wenting Zhao et al. Serenity: Analysis for Library Based Python Code. Conference'17, Jul. 2017, Washington, DC, pp. 14.
A. Svyatkovskiy et al. 2019. Pythia: AI-assisted Code Completion System. pp. 19.
D. Guo et al. 2021. Graphcodebert: Pre-training code representations with data flow. pp. 18.
A. Svyatkovskiy et al. 2021. Fast and memory efficient neural code completion. pp. 12.
Y. Yang et al. 2019. Improve Language Modelling for Code Completion by Tree Language Model with Tree Encoding of Context. pp. 6.
S. Prokosch et al. 2015. Intelligent Code Completion with Bayesian networks. pp. 1-31.
TabNine: https://spectrum.ieee.org/qa-this-autocompletion-tool-aims-to-supercharge-your-coding. pp. 7.
Github Co-pilot: https://siliconangle.com/2021/06/29/githubs-new-copilot-programming-assistant-uses-ai-generate-code/. pp. 11.
D. Vagavolu et al., 2021, A Mocktail of Source Code Representations. pp. 5.
W. Ahmad et al, 2021 Unified Pre-training for Program Understanding and Generation. pp. 14.
S. Gao et al. 2021 Code Structure Guided Transformer for Source Code Summarization. pp. 13.
"Mypy", downloaded Jan. 8, 2025 from https://mypy-lang.org/ © 2014 the mypy project, 2 pages.
Chen et al. "Evaluating large language models trained on code." arXiv preprint arXiv:2107.03374 (2021), 35 Pages.
Grove et al. "A framework for call graph construction algorithms." ACM Transactions on Programming Languages and Systems (TOPLAS) 23.6 (2001): pp. 685-746.
Pytype, downloaded Jan. 8, 2025 from https://github.com/google/pytype, © 2025 GitHub, Inc., 8 pages.
Raychev et al. "Probabilistic Model for Code with Decision Trees", SIGPLAN Not. 51, 10 (Oct. 2016), pp. 731-747. https://doi.org/10.1145/3022671.2984041.
Vaswani et al. "Attention is all you need", In Advances in neural information processing systems, obtained from arXiv:1706.03762v5 Dec. 6, 2017, 15 pages.
Wang et al. "Codet5: Identifier-aware unified pre-trained encoder-decoder models for code understanding and generation." arXiv preprint arXiv:2109.00859 (2021), 13 pages.
Wolf et al. "Transformers: State-of-the-Art Natural Language Processing", In Proceedings of the 2020 Conference on Empirical Methods in Natural Language Processing: System Demonstrations. Association for Computational Linguistics, 2020, Online, pp. 38-45. https://www.aclweb.org/anthology/ 2020.emnlp-demos.6.

\* cited by examiner

```
1   debug_level = 3
2
3   if debug_level > 5:
4       def fd(model, test, train):
5           assert len(test) <500
6           model.fit(train, test)
7       fitit = fd
8
9   else:
10      fitit = lambda model, test, train:
        ↳   model.fit(train, test)
11
15  from sklearn.svm import LinearSVC
16
17  from pystruct.models import MultiClassClf
18  from pystruct.learners import (NSlackSSVM,
    ↳ OneSlackSSVM, SubgradientSSVM,
    ↳ FrankWolfeSSVM)
19
20  digits = load_digits ()
21  X, y = digits.data, digits.target
22  X = X / 16.
23  X_train, X_test, y_train, y_test =
    ↳ train_test_split(X, y)
24
25  # we add a constant 1 feature for the bias
26  X_train_bias = np.hstack([X_train,
    ↳ np.ones((X_train.shape[0], 1))])
41
42  fw_bc_svm = FrankWolfeSSVM(model, C=.1,
    ↳ max_iter=50)
71
72  libsvm =
    ↳ LinearSVC(multi_class='crammer_singer',
    ↳ C=.1)
73  start = time()
74  fitit(libsvm, X_train, y_train)
75  time_libsvm = time() - start
76   print("Score with sklearn and libsvm: %f
    ↳  (took %f seconds)" %
    ↳ (libsvm.score(X_test, y_test),
    ↳ time_libsvm))
77
78  start = time()
79  fitit(fw_bc_svm, X_train_bias, y_train)
```

FIG. 1

```
1  import sys
2
3  if sys.argv[1] == "class1" or sys.argv[1] == "j
4    class X:
5        pass
6
7   if sys.argv[1] == "inst":
8      X = X()
9
10 elif sys.argv[1] == "class2":
11    class X:
12        def __new__(*args):
13            return 0
14
15 elif sys.argv[1] == "def1":
16    def X():
17        return 1
18
19 elif sys.argv[1] == "def2":
20    X = lambda: 2
21
22 elif sys.argv[1] == "import":
23    import X
24
25 elif sys.argv[1] == "method":
26
27        if sys.argv[2] == "static":
28            class X:
29                def s():
30                    return 5
31
32        X = X.s
33
34        elif sys.argv[2] == "instance":
35            class X:
36                v = 4
37                def i(self):
38                    return self.v
39
40        y = X()
41        x = y.i
42
43
44 print(str(X))
45 print(str(X()))
```

FIG. 2

```
1  print("Score with pystruct subgradient
   ↪  ssvm: %f (took %f seconds)" %
   ↪  (np.mean(y_pred == y_test),
   ↪  time_subgradient_svm))
2
3  # the standard one-vs-rest multi-class
4  # would probably be as good and faster
5  # but solving a different model
6  libsvm =
   ↪  LinearSVC(multi_class='crammer_singer',
   ↪  C=.1)
7  start = time()
8  libsvm.fit(X_train, y_train)
9  time_libsvm = time() - start
10 print("Score with sklearn and libsvm: %f
   ↪  (took %f seconds)" %
   ↪  (libsvm.score(X_test, y_test),
   ↪  time_libsvm))
11
12
13 start = time()
14 fw_bc_svm.[?]
```

*FIG. 4*

```
1  from sklearn.cross_validation import
   ↪  train_test_split
2  from pystruct.models import MultiClassClf
3  from pystruct.learners import (NSlackSSVM,
   ↪  OneSlackSSVM,
4  digits = load_digits()
5  digits.data
6  digits.target
7  X = X / 16.
8  train_test_split(X, y)
9  X_train_bias = np.hstack([X_train,
   ↪  np.ones((X_train.shape[0], 1))])
10 model =
   ↪MultiClassClf(n_features=X_train_bias.shape[1],
   ↪n_classes=10)
11 fw_bc_svm = FrankWolfeSSVM(model, C=.1,
   ↪max_iter=50)
12 fw_bc_svm.[?]
```

*FIG. 5*

```
1  def f_Hp(self, pars, p, inpt, target):
2      eps = 1E-6
3      deriv = self.fprime(pars, inpt,
    ↳    target)
4      offseted = self.fprime(pars + p *
    ↳    eps, inpt, target)
5      return (offseted - deriv) / eps
```

```
1   response.json.return_value = dict(response,
        total_count=3, limit=0, offset=0)
2       projects =
            self.redmine.project.all()
3       self.assertEqual(projects.limit, 0)
4       self.assertEqual(projects.offset,
            0)
5       self.assertEqual(projects[0].id, 1)
6       self.assertEqual(projects[1].id, 2)
7       self.assertEqual(projects[2].id, 3)
8
9   def test_offset_limit(self):
10      response_with_limit_offset =
            {'total_count' : 2, 'limit' : 3,
            'offset' : 1, 'projects' :
            response['projects'][1:3]}
11      self.response.json.return_value =
            response_with_limit_offset
12      projects=
            self.redmine.project.all()[1:3]
13      self.assertEqual(projects.limit, 3)
14      self.assertEqual(projects.offset,
            1)
15      self.assertEqual(projects[0].id, 2)
16      self.assertEqual(projects[1].id, 3)
17
18  def test_offset_limit_mimic(self):
19      projects =
            self.redmine.project.all()[1:3]
20      self.assertEqual(projects.limit, 3)
21      self.assertEqual(projects.offset,
            1)
22      self.assertEqual(projects[0].id. ?
```

*FIG. 9*

```
1   from tests import unittest, mock, Redmine,
        URL
2   Redmine(self.url)
3   projects = self.redmine.project.all()[1:3]
4           self.assertEqual(projects[0].?
```

*FIG. 10*

```
1   import sys
2   import logging
3   from functools import partial
4   from datetime import datetime
5   from abc import ABCMeta, abstractmethod
6   import json
7   from_config import AttrDict
8
9   __all__ = ['multikey_getter_gen'
            'unescape_json', 'LogParser',
            'JSONParser', 'LogLine',
10                'AccessLog', 'CommonLogFormat',
                    'uWSGIParser']
11
12  def multikey_getter_gen(parser, keys,
        is_indices=False, delimiter="\t"):
13      """Generator meta-function to return a
         function
14      parsing a logline and returning
        multiple keys (tab-delimited)"""
15      if is_indices:
16          keys = map(int, keys)
17
18      def multikey_getter(line, parser,
            keyset):
19          data = parser(line.strip())
20          return
            delimiter.join((unicode(data[k])
            for k in keyset))
21
22      def multiindex_getter(line, parser,
            keyset):
23          data = parser(line.strip())
24          return delimiter.join((unicode(
            data.by_index( idx-1,
            raw=True)) for idx in keys))
25
26      if is_indices is True:
27          # Field indices
28          return [?]
```

*FIG. 11*

```
1  partial = #!/usr/bin/env python #
2  from functools import partial
3  keys = map(int, keys)
4           return ?
```

```
 66 data = pd.read_csv("../input/indian_liver_patient.csv", low_memory=False)
```

Code in Between that Defines a New Function etc

```
184 data = data.where(pd.notnull(data), data.median(), axis='columns')
185 data.isnull().sum()
```

```
 66 data = pd.read_csv("../input/indian_liver_patient.csv", low_memory=False)
```

Code in Between that Defines a New Function etc

```
184 data = data.where(pd.notnull(data), data.median(), axis='columns')
185 data.isnull().sum()
```

```
data = pd.read_csv('../input_liver_patient.csv', low_memory=False)
```

Code in Between that Defines a New Function etc

```
data = data.where(pd.notnull(data), data.median(), axis='columns')
cols = data.columns
```

Input Graph 1
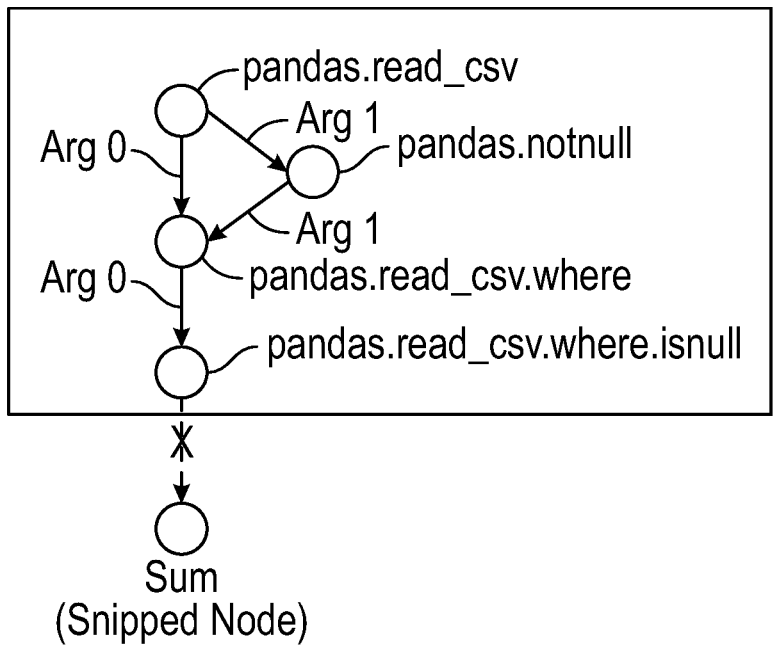
Input Graph 2
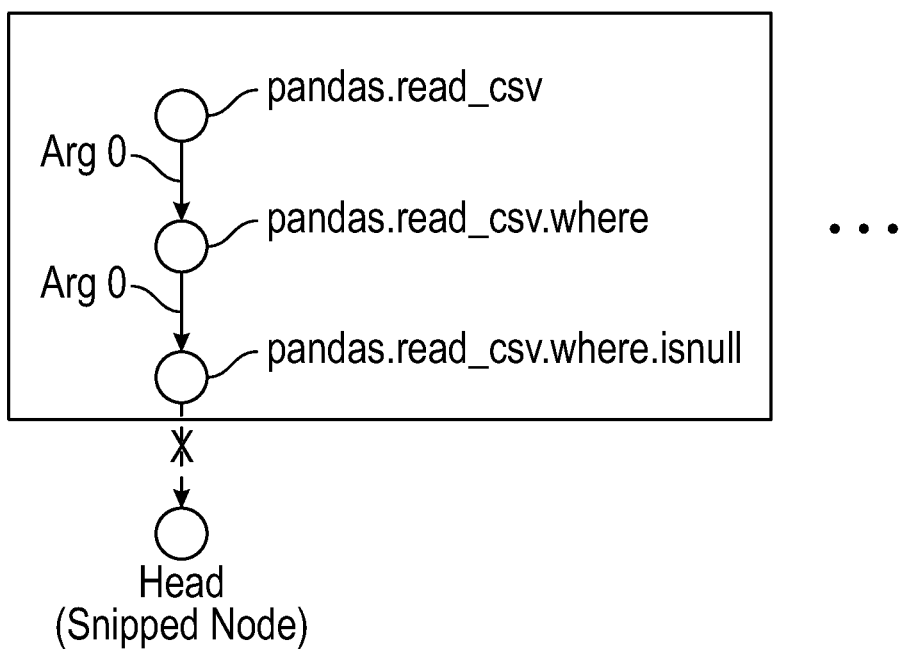
FIG. 18

100

Computer 101

Processor Set 110
| Processing Circuitry 120 | Cache 121 |

Communication Fabric 111

Volatile Memory 112

Persistent Storage 113
Operating System 122
200

Peripheral Device Set 114
| UI Device Set 123 | Storage 124 | IoT Sensor Set 125 |

Network Module 115

End User Device 103

102 WAN

Remote Server 104
Remote Database 130

Private Cloud 106

Gateway 140

141 Cloud Orchestration Module

142 Public Cloud 105
Host Physical Machine Set

Virtual Machine Set 143

Container Set 144

*FIG. 19*

PERFORMING CODE COMPLETION USING DATA FLOW

BACKGROUND

The present invention relates generally to the electrical, electronic and computer arts and, more particularly, to computer-aided software engineering and machine learning.

Dynamically typed languages such as PYTHON® (registered mark of PYTHON SOFTWARE FOUNDATION Beaverton OREGON USA) have become very popular. Among other strengths, Python's dynamic nature and its straightforward linking to native code have made it the de-facto language for many research areas such as Artificial Intelligence. PYTHON is dynamically typed and has a dynamic object structure, such that methods can be freely assigned and modified. Beyond the language itself, many of the rich collections of PYTHON libraries, especially the math-heavy libraries used in machine learning, are implemented in native code.

BRIEF SUMMARY

Principles of the invention provide techniques for performing code completion using data flow. In one aspect, an exemplary method includes the operations of accessing, using a hardware processor, a corpus of source code from a code database, training, using the hardware processor, a language prediction model based on the corpus of source code, accessing, using the hardware processor, a given program, predicting, using the hardware processor, a completion of a given line of the given program by performing inferencing using the language prediction model and at least a portion of the given program and completing, using the hardware processor, the given line based upon the prediction.

In one aspect, a computer readable medium comprises computer executable instructions which when executed by a computer cause the computer to perform the method of accessing a corpus of source code from a code database, training a language prediction model based on the corpus of source code, accessing a given program, predicting a completion of a given line of the given program by performing inferencing using the language prediction model and at least a portion of the given program, and completing the given line based upon the prediction.

In one aspect, an apparatus comprises a memory and at least one processor, coupled to the memory, and operative to perform operations comprising accessing a corpus of source code from a code database, training a language prediction model based on the corpus of source code, accessing a given program, predicting a completion of a given line of the given program by performing inferencing using the language prediction model and at least a portion of the given program, and completing the given line based upon the prediction.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

Techniques as disclosed herein can provide substantial beneficial technical effects. Some embodiments may not have these potential advantages and these potential advantages are not necessarily required of all embodiments. By way of example only and without limitation, one or more embodiments may provide one or more of:

improve the technological process of computer-aided software engineering by providing an improved computer-aided software engineering tool featuring code completion technology;

improve the technological process of computer-aided software engineering by providing improved code completion accuracy, as compared to the prior art, using code data flow graphs;

improve the technological process of computer-aided software engineering by providing techniques that permit faster writing of software, as compared to the prior art, due to the improved code completion accuracy; and improve the technological process of computer-aided software engineering by providing analysis of data flow graphs to facilitate code completion.

Some embodiments may not have these potential advantages and these potential advantages are not necessarily required of all embodiments. These and other features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 1 illustrates an exemplary snippet of PYTHON code adapted from a benchmark;

FIG. 2 illustrates dynamic code examples and the kind of dynamism with which analysis of PYTHON must contend;

FIG. 4 is an example code snippet use for prediction, in accordance with an example embodiment;

FIG. 5 shows an example of a code snippet corresponding to a slice from the analysis graph and an example of how such a dataflow based slice looks for the code in FIG. 1, in accordance with an example embodiment;

FIG. 9 shows a code snippet where local text can help prediction, in accordance with an example embodiment;

FIG. 10 shows code where data flow lacks sufficient context, in accordance with an example embodiment;

FIG. 11 shows an example where complete text may have text relevant to the prediction, but distant from call site, in accordance with an example embodiment;

FIG. 18 shows an example of two similar data flow graphs; and

FIG. 19 depicts a computing environment according to an embodiment of the present invention.

Figure 3:
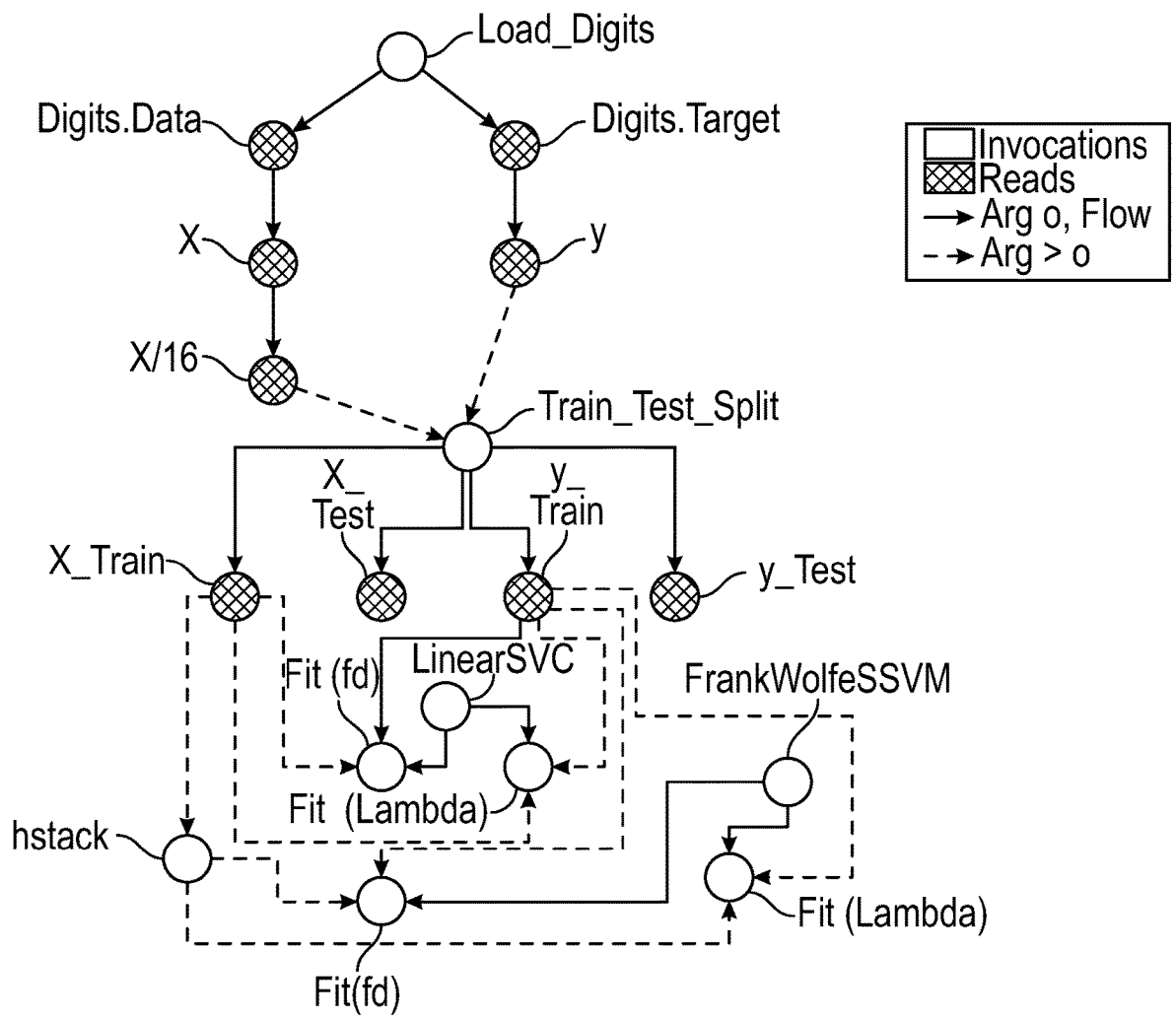
FIG. 3 illustrates a dataflow graph for the running example of FIG. 1, in accordance with an example embodiment.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of inventions described herein will be in the context of illustrative embodiments. Moreover, it will become apparent to those skilled in the art given the teachings herein that numerous modifications can be made to the embodiments shown that are within the scope of the claims. That is, no limitations with respect to the embodiments shown and described herein are intended or should be inferred.

INTRODUCTION

Dynamically typed languages such as PYTHON have become very popular. Among other strengths, PYTHON's dynamic nature and its straightforward linking to native code have made it the de-facto language for many research areas such as Artificial Intelligence. This flexibility, however, makes static analysis of PYTHON and similar languages very difficult, due in part to features often regarded as strengths: its dynamic nature and its straightforward linking to native code. PYTHON is dynamically typed, so the aid that static types provide to analysis of, for example, the language JAVA® (registered mark of Oracle America, Inc. REDWOOD SHORES CALIFORNIA USA) is not available. PYTHON has a dynamic object structure; methods can be freely assigned and modified, complicating resolving calls. Even basic constructs such as method calls and object creations can be ambiguous in the basic syntax. Beyond the language itself, many of the rich collections of PYTHON libraries, especially the math-heavy libraries used in machine learning, are implemented in native code, which makes analysis require cross-language support. For these reasons among others, there is believed to be a lack of widely-used analysis frameworks for PYTHON, despite the value such analysis would have, for instance, for tools. Moreover, the difficulties with static analysis of dynamically-typed languages may impede the performance of computer-aided software engineering tasks, such as identifying and selecting candidate suggestions for the autocompletion of code during code writing activities. While creating a sound, or a soundy (that is, sound in all but a few well-defined areas), analysis for PYTHON remains an open problem, an exemplary framework (referred to herein as "Serenity") for static analysis of a dynamically typed high-level programming language (of which PYTHON, Ruby, and Perl are non-limiting examples) is disclosed herein, which is practical for many tasks. The Serenity framework exploits two basic mechanisms: (a) reliance on dynamic dispatch at the core of language translation, and (b) extreme abstraction of libraries, to generate an abstraction of the code. The efficiency and usefulness of Serenity's analysis is demonstrated with an application for code completion. We have found that such analysis has a strong signal, and can be leveraged to establish state-of-the-art performance, comparable to neural models and dynamic analysis respectively. Note that references herein to "Serenity" should be understood as references to a non-limiting exemplary embodiment; not all embodiments necessarily have all features as describe with regard to "Serenity."

Static analysis of PYTHON and similar languages is difficult, due in part to features often regarded as strengths: its dynamic nature and its straightforward linking to native code. PYTHON is dynamically typed, so the aid that static types provide to analysis of, for example, JAVA is not available. PYTHON has a dynamic object structure; methods can be freely assigned and modified, complicating resolving calls. Even basic constructs such as method calls and object creations can be ambiguous in the basic syntax. Beyond the language itself, many of the rich collections of PYTHON libraries, especially the math-heavy libraries used in machine learning, are implemented in native code, which makes analysis require cross-language support. For these reasons among others, there is believed to be a lack of widely-used analysis frameworks for PYTHON, despite the value such analysis would have, for instance, for tools.

However, while creating a sound, or a soundy, analysis for PYTHON remains an open problem, the Serenity framework is sufficient for some tasks. Beyond a relatively direct translation of PYTHON Abstract Syntax Tree (AST) into a Control Flow Graph (CFG), Serenity exploits two basic mechanisms:

Reliance on dynamic dispatch at the core of language translation: it is not always possible even to tell whether a construct is an object creation or a function call, and this is just one example. The disclosed approach to such situations is to turn them into dynamic dispatches over types representing constituent constructs. The number of subtleties of PYTHON that can be modeled in this way is detailed below.

Extreme abstraction of libraries: user code often makes heavy use of APIs to create and operate upon domain objects, such as arrays in NumPy (Numerical PYTHON) (a pertinent package for scientific computing in PYTHON), but these objects are often fairly opaque to the user code. As such, it often suffices to treat libraries by just tracking the objects they create and methods called upon them. This is not, nor is it designed to be, soundy, let alone sound. We have found that this nevertheless enables useful modeling of user code.

It is first described how PYTHON is modeled and how the library abstraction still provides a useful analysis of user code. It is then demonstrated that this analysis is useful where the focus is on an application that depends on the outputs of such analysis: code completion is a core functionality expected in all integrated development environment (IDEs), where the goal is to suggest methods, functions, and the like to call given prior code. It is shown how the disclosed dataflow analysis allows a focus on relevant code at a point of completion, which when combined with local program context prior to the function or other call, produces much better code completion performance than the context alone.

A Running Example

FIG. 1 illustrates a running example: a snippet of PYTHON code adapted from a known benchmark. A modification of lines 1 to 10 adds some debugging options to illustrate complexities in PYTHON. The variable fitit is assigned one of two functions depending on debug_level: either a closure or a function with an added assertion. The code loads a digits dataset (line 20), reads specific fields of the dataset (line 21), manipulates the dataset (line 22), splits the data into train and test splits (line 23), and finally creates X_train_bias (line 26). The code then creates machine learning models FrankWolfeSSVM (line 42) and LinearSVC (line 72). The code then calls them: a fitit call on a LinearSVC (line 74) takes the model (line 26), and fitit is called on FrankWolfeSVC with X_train_bias (line 79). Note that the call to the constructor FrankWolfeSSVM is on line 42, and the fitit call on the object is on line 79, reflecting a property of most code—it is non-local.

Analysis

A Call Graph Framework

The skilled artisan will be familiar with prior art work that provides a framework for expressing call graph algorithms for object-oriented languages, encapsulating the bulk of the algorithm, and parameterizing the algorithms with functions that determine how to add context sensitivity. The following two aspects are pertinent:

First, the Procedure Key Selection Function (PKS) is introduced, which is essentially a way to specify when called functions should be analyzed in a context-sensitive manner.

Second, the framework distinguishes between function call sites and object creation sites, which, as seen in FIG. 2, is not possible, in general in PYTHON. Hence, the two sets are combined into a single one.

The framework prior art defines relevant program features, which are excerpted below:
Class: all class declarations in the program;
InstVariable: all instance variable declarations of the program;
Procedure: all procedure declarations of the program;
Variable: all variable names used in the program;
CallSite: all call sites in the program;
NewSite: all new sites in the program;
LoadSite: all loads of instance variables in the program;
StoreSite: all stores to instance variables in the program.

Two changes from the framework prior art are implemented herein:

InstVariables is taken to be the set of strings possibly used as field names, rather than a set of declared field names, which it is in the original framework. While field names can be defined in PYTHON, this is entirely optional so such definitions are ignored.

NewSites becomes the same as the set CallSites to effect the second item above; that is, there is one set that combines all possible call sites and creation sites. This represents the fact that every site can potentially see both classes and functions.

Language Modeling

FIG. 2 illustrates dynamic code examples and the kind of dynamism with which analysis of PYTHON must contend, in this case 5 different options for the meaning of X( ) on line 45 based on the value supplied as sys.argv[1] and sometimes sys.argv[2]:
class1: class X (line 4) defines an ordinary class named X, of which line 45 creates an instance;
class2: class X (line 11) defines a class named X that redefines the new operator, so line 45 just returns 0;
def1: def X (line 16) defines a function named X, and calling it at line 45 returns 1;
def2: X=lambda . . . (line 20) creates a closure and assigns it to X; calling the closure at line 45 returns 2;
import: The module X (line 23) overrides default module behavior to become callable and return 3 at line 45;
method static X (line 32) is assigned the static method s of class X (line 28) which returns 5 at line 45;
method instance X (line 41) gets a bound instance method (i.e. a closure over y) i of class X (list 35), returning 4 at line 45).

Note that all of these definitions of X can flow to the same call at line 45, so there is no syntactic distinction between different kinds of allocations, calls, and even modules in some cases. Furthermore, in one or more embodiments, class and function names are all first class. Thus, analysis should handle these basic operations in a dynamic manner, unlike e.g. JAVA, where calls, allocations and imports have clear syntactic distinctions. Note further that even basic method calls require closures to handle line 41.

The X( ) at line 45 is a call on X, and this allows the use of standard dynamic dispatch to model all of this behavior, using synthetic "methods" where needed to handle language semantics. A similar "dispatch" at field accesses will be used to handle the difference between class and instance fields, which again can only be known from the object accessed. These indirections are made use of to define the disclosed framework model in the section entitled "Framework modeling."

The terminology of the prior-art framework reference is adopted herein to present the disclosed techniques as extensions to standard object-oriented call graph construction. To fit the disclosed dynamic PYTHON context, a few changes are made to the core definitions of the prior-art framework reference. These changes reflect that PYTHON does not require that fields be declared in order to be used, and it makes no syntactic distinction between calls and allocations. Furthermore, as is standard for representing first-class entities in an object-oriented framework, one class is used for each first-class entity. As FIG. 2 shows, classes, functions, methods and modules are all first-class, so the set of classes for analysis includes the following:
$C_{class}$ a class representing program class C;
$C_{inst}$ a class representing instances of class C;
$M_{inst}$ a class representing instances of module M;
$D_{inst}$ a class representing instances of function D;
$S_{inst}$ a class representing the instance of script S.

Now, most of the irregularities of PYTHON calls and creations are handled by treating every call site as a CallSite for each receiver type $*_{inst}$ and as a NewSite for every receiver type $*_{class}$. The site on line 45 in FIG. 2 would have some types handled by each mechanism. Fields are also handled seamlessly: on line 32, X is a $C_{class}$, and on line 41 X is a $C_{inst}$, so static and instance state are handled by making static fields be instance fields of the class object.

Call graph construction starts with a root stub that creates an instance of the main script $S_{inst}$ and calls that instance.

Framework Modeling

In many situations, it is difficult or impossible to find actual code for PYTHON imports: there is no fixed relationship between names in import statements and locations of actual source code. Even if there were, the structure of PYTHON libraries is such that large amounts of the code is native and hence a PYTHON analysis framework is not applicable. Even if it were possible to find PYTHON code, many libraries are large enough to make precise analysis challenging. In the present case, the behavior of application code is of interest rather than library internals, so these issues are minimized by largely not analyzing framework code.

An exemplary model, referred to herein as "Turtles," abstracts PYTHON frameworks to capture how the framework interacts with user code and to ignore all of its internal details. Note that references herein to "turtles" should be understood as references to a non-limiting exemplary embodiment; not all embodiments necessarily have all features as describe with regard to "turtles." Specifically, four aspects are modeled, all using the indirections of the section entitled "Language modeling":

1) Import statements are modeled as returning a new framework, denoted by the name of the imported module. The framework is an opaque object with no functionality beyond implementing the model.
2) Calls to framework functions and methods typically return something, which is then possibly used by the user code. Every call to the framework is modeled as returning a new object from it; this model is transitive, so calls on those objects return further new objects from the framework. These objects are labeled with the path by which they are accessed.
3) Accesses to fields of framework objects have little meaning in the disclosed model since the framework state is not modeled at all. However, user code typically expects that a field access returns something; all such field accesses are modeled as returning the container object.
4) Arguments to turtle methods are mostly ignored, since what the framework does to them is not modeled; however, sometimes functions are passed as parameters, and it is assumed that the framework might call such functions. Since the internal framework state is not modeled, the model invokes callbacks from where they are passed as arguments.

The framework prior art provides customization support helpful in implementing one or more embodiments. A new type of class, $T_{path}$, is introduced that represents a turtle, i.e. an opaque model object. Item 1 is implemented by modeling import M statements as a call to a synthetic import procedure with M as its argument. This call is modeled as returning a $T_M$. Item 2 is implemented as a Procedure Key Selection Function (PKS) which takes the receiver of a type $T_{path}$ and the name n of the called procedure and returns a new turtle of $T_{path,n}$. Item 3 is implemented by simply returning "self" when reading any field of any $T_{path}$ type. Item 4 is implemented as a PKS that generates calls for every argument that is of a function type.

Inheritance from Turtles

One wrinkle in the data is that application classes often inherit from turtle classes, meaning that method calls on self should logically be turtle methods when the method read is never assigned. That is, if a read of self is to a field or method that is never assigned and the class inherits from a turtle, the read should return a new turtle object to capture unknown superclass behavior. However, this is tricky to do because, since methods and fields can be assigned anywhere in the code, it is not, in general, possible to know if one will not be assigned until analysis terminates. Such reads should be recorded and, when analysis terminates, they are processed as turtle reads and analysis is restarted. This restarting itself may need to be repeated, since reading one turtle may make more code reachable.

Analysis of Running Example

FIG. 3 illustrates a dataflow graph for the running example of FIG. 1, in accordance with an example embodiment. When this analysis is applied to the running example (FIG. 1), the result is the dataflow graph shown in FIG. 3. To illustrate the disclosed framework model, observe the import call of LinearSVC on line 15; as an import, this returns an object of type $LinearSVC_{inst}$, that is, an instance of the module. When this is called (line 72), it returns a turtle of type $T_{LinearSVC}$, illustrated by the unfilled node labeled LinearSVC. When fit is called on this object in the fitit functions (line 74), item 2 means it returns a derived turtle of type $T_{LinearSVC.fit}$, shown as an unfilled node labeled fit. Since fit is called on LinearSVC, a solid data flow edge connects them. On the other hand, the other non-self arguments to fit are shown with dashed arrows. Other turtle functions are shown similarly: load_digits, train_test_split, hstack, FrankWolfeSSVM. Note that analysis has no idea what these functions do, just that they pass data. Note also that fitit is a variable holding one of two first-class functions, and it is called for both of the machine learning models created. To get the precise results shown in FIG. 3 requires analysis infrastructure that handles first-class functions and also does context-sensitive analysis. In particular, the model objects and the data flow to both the normal and debugging functions are assigned to fit, since both potentially flow to fitit. In FIG. 3, the nodes are distinguished with labels of the function in which they occur.

Other nodes in FIG. 3 represent local dataflow. The top-most two cross-hatched nodes represent reads of the data and target fields of data, so they have edges from the load_digits call and edges to their respective variables X and y. X is scaled by 16, shown by the nodes labeled X/16. X/16 and y then flow to train_test_split with dashed edges since they are arguments.

This graph focuses on data flow, which captures patterns of how the various turtle APIs are used across programs. This allows the learning of patterns that enable the present applications.

Implementation

The present analysis is implemented using Watson Libraries for Analysis (WALA) (available from International Business Machines Corporation, Armonk, NY, USA) and its support for both PYTHON 2 and PYTHON 3 using the Jython (implementations of PYTHON in JAVA) system. WALA is built to be extensible, and several features were used to ease the implementation work. It should be noted that WALA is one non-limiting example of a system for providing static analysis capabilities for JAVA bytecode and related languages.

The main extension is for handling turtles. For item 1, the model function that handles import is overridden to return a synthetic object with a turtle type named for the given module. For item 2, the selection of called methods for turtle classes is overridden so that any call goes to a synthetic method that creates and returns a turtle with the appropriate extended turtle name. For item 2, this synthetic method mostly ignores its arguments, except generating a call to each one to handle callbacks. For item 3, the code handling field reads are overridden to simply return the container if it is of turtle type.

The other configuration is to add aggressive context sensitivity for all turtle types. We have found that it is inexpensive to ensure that every call site is analyzed separately.

Code Completion Application

Consider the utility of Serenity's analysis and whether it can help other applications, despite the challenges in modeling dynamic languages such as PYTHON accurately. As a first application, a code completion use case is examined, which is covered below in detail. Code completion refers to the problem where, when given a snippet of a program, the problem is to predict a function call, analogous to what an IDE does for method suggestions. We have found that for code completion, the analysis requirement is that the methods be callable from a specific type, and so analysis for code completion is focused on detecting the types of objects. For languages such as PYTHON, type inference is hard, but we have found that code completion can benefit significantly from the data flow analysis that Serenity produces, simply because data flow can provide a focused context for code completion.

Recently, there have been a plethora of neural models of code trained with the objective of either predicting randomly masked tokens in code, or predicting the very next token, which one might assume is consistent with the task of code completion. One pertinent question is whether the extensive training of these models combined with data flow analysis on millions of programs can be leveraged to perform code completion. Specifically, consider whether data flow analysis provided by Serenity can improve code completion when combined with these neural models. If data flow analysis does provide any signal from Serenity, it should improve performance on the code completion task even with the extensive training these language models already had. Code completion was therefore modeled as a fine-tuning task, and varied the training inputs of fine tuning to be one of the three conditions shown below:

all code as text prior to the function call;
a slice of the code restricted to source expressions that are relevant to a function call in data flow; and
both code as text, as well as the slice, separated by a token to distinguish the two inputs.

FIG. 4 is an example code snippet use for prediction, in accordance with an example embodiment. For all text code prior to a function call, there are limits on how many tokens modern language models can fit. That is, when the code goes beyond the limit, truncation is needed in order for the models to run. A widely-used truncation strategy is to only keep n tokens prior to the prediction point, where n is the maximum sequence length, which can lead to fairly local information, as shown in FIG. 4 for the running example shown in FIG. 1. A pertinent aspect in FIG. 4 is to predict what method will be called on fw_bc_svm, but notice that the construction of fw_bc_svm is out of the scope of the truncation.

For obtaining the slice restricted purely to dataflow, given a program and its corresponding dataflow graph, to predict the function call, the method begins at a node that is desired to be predicted, reverses all edges coming into the node, and finds all reachable nodes. Each node in the reachability set corresponds to a source expression in the original program, and the expressions that are not sub-expressions of any other expressions are included as features. Then, these expressions are ordered according to their positions in the source files, and variable names from the analysis artifacts are added in so the code looks more or less like real code that the language models have been trained on. FIG. 5 shows an example of a code snippet corresponding to a slice from the analysis graph and an example of how such a dataflow based slice looks for the code in FIG. 1, in accordance with an example embodiment. Here, the fw_bc_svm.fit call in FIG. 3 is started, all edges coming into the node are reversed, and a reachability analysis is performed, to gather the slice, adding variable names such as digits=load_digits( ). In this example, dataflow analysis does give important information useful for predicting the function call, because the slice brings in non-local but relevant code such as the definition of fw_bc_svm into the scope of text that can be fed to a neural model.

Dataset

A popular benchmark dataset was used, which comes with 100K programs used for training, and the remaining 50K used as a testing set. The benchmark dataset was analyzed using Serenity, and 147,288 of 150,000 files were successfully analyzed. For the analyzed files, each file was parsed with a PYTHON AST parser, and all function calls were gathered. For each function call identified by the AST, it was examined whether the function could be found in the analysis output, and if it was found in the output, a check was performed to determine if the source location of the call matched that in the AST. It has been observed that the Jython source mappings are not always correct, so both metrics were used to measure the completeness of the analysis. The analysis found 58.77% of function calls in the AST with matching source locations, and 67.36% of function calls when the requirements to match source was relaxed. Manual inspection of a few cases where source locations did not match indicated that the problem was indeed mapping being incorrect in Jython. Further investigation revealed that many of the missing calls are instances of PYTHON primitives that Serenity does not model and treats as no-ops, such as repr and Future Warning. A small fraction was found to be genuinely dead code, especially when PYTHON files were integral parts of a larger application, as they often are in the benchmark dataset.

Figures 6, 7:
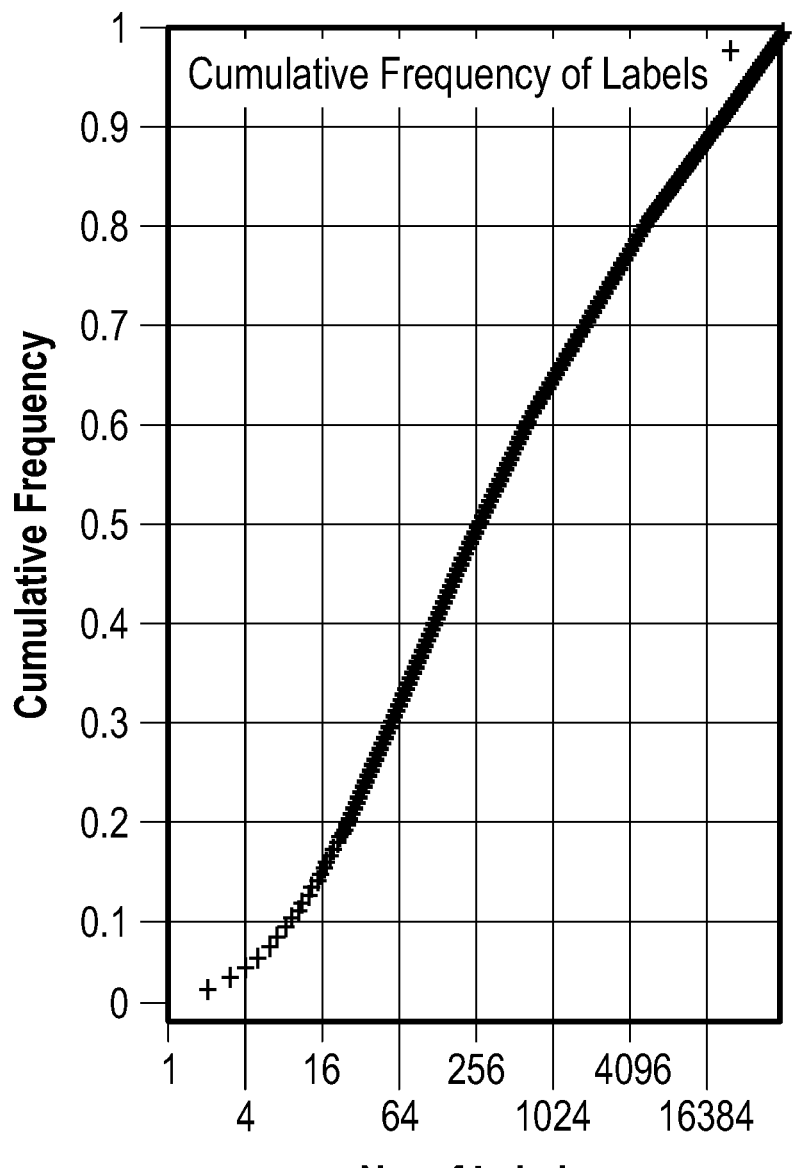
FIG. 6 is an example of code where a leaf node is an expression, in accordance with an example embodiment.
FIG. 7 plots the cumulative frequency distribution of labels against the number of labels for the classification task, in accordance with an example embodiment.

To generate the slices, leaf nodes were started with, and restriction was limited to cases where the nodes had at least a depth of 1 when the edges were reversed. FIG. 6 is an example of code where a leaf node is an expression, in accordance with an example embodiment. It is noted that in a majority of cases, leaf nodes were actually expressions, as shown in the example code in FIG. 6. These were ignored in creating the present dataset because the focus was on a problem that cannot be solved by a pure lexical analysis of code. When restriction to nodes that were potentially function calls rather than expressions was observed, slices were generated from 65.35% of the programs where there existed at least one slice where the leaf node was likely a function call. For the train and test sets of programs, 334,415 slices and 162,847 slices were generated, respectively, by iterating over all the leaf nodes in dataflow graphs. Once leaf nodes are considered as nodes for the prediction, there were a total of over 65K labels that were generated across train and test sets for code completion. FIG. 7 plots the cumulative frequency distribution of labels against the number of labels for the classification task, in accordance with an example embodiment. As shown in FIG. 7, the distribution of labels follows the usual power law, but it is noted that the most popular label appeared across train and test only 1.7% of the time, and the top 10 labels cumulatively appeared only 11.0% of the time. In other words, this is a difficult classification problem. It is noted that this method of declaring code completion is more realistic compared to other techniques for code completion (such as measuring next token prediction), in the sense that this is often the case that IDEs focus on.

Language Model Selection

To decide on the best neural model to use as a basis for the code completion experiments, a number of conventional code related language models were tested. One of the conventional code related language models ("Model 1") is a bimodal model trained on datasets with natural language (NL)-programming language (PL) pairs (e.g. documentation/code pairs) across six programming languages (PYTHON, JAVA, JavaScript, PHP, Ruby, and Go). Similarly, another of the conventional code related language models ("Model 2") uses NL-PL pairs for pretraining a code language model, but based on local data flow graphs extracted from Abstract Syntax Trees. A third conventional code related language model ("Model 3") is another BERT-based model fine-tuned on multiple classification tasks such as checking the presence of certain bugs and predicting exception types. It is trained only on PYTHON code, and furthermore uses language level tokens as inputs to the model. A fourth conventional code related language model ("Model 4") is an encoder-decoder model based on T5 architecture with code-specific knowledge trained to distinguish which tokens are identifiers and recover them when they are masked out. It is fine-tuned using multiple conventional benchmarks including understanding tasks such as code defect detection and clone detection, and generation tasks like code summarization and translation.

Figure 8:
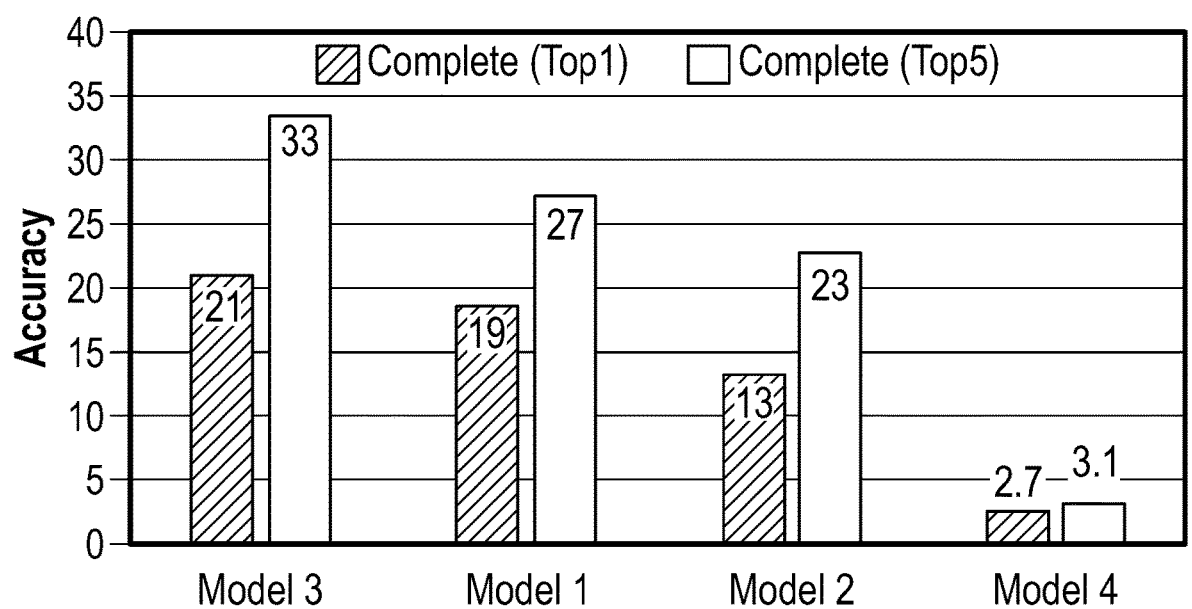
FIG. 8 shows the performance of these different models on the code completion task with no fine tuning for the top-1 and top-5 cases, in accordance with an example embodiment.

FIG. 8 shows the performance of these different models on the code completion task with no fine tuning for the top-1 and top-5 cases, in accordance with an example embodiment. Code completion was modeled as a mask prediction task, with the function call to be predicted being the masked token. Accuracy on top-5 and top-1 test data for base language models is shown. Performance on the third conventional code related language model for slices is based on 150,739 and 137,987 examples for complete and slice, respectively because of tokenization issues. For all other systems, the number of testing examples was 167,816. As shown in FIG. 8, the best performing model was the third conventional code related language model on this task, which is not surprising because it was the only model trained exclusively on PYTHON and used language level tokens unlike the other models. It is noted that the performance of the fourth conventional code related language model was surprisingly poor, but it is believed this may in part be due to the fact that it is trained on NL-PL pairs and it is strictly a generative model, for which a length of generation needed to be specified. It also needed the most tuning in terms of specifying different search strategies for final token prediction, so it is possible that the optimal search strategy was not chosen for it. For the present purposes though, the third conventional code related language model was chosen as a base, primarily because it was expected to benefit most from fine tuning. It is pointed out that given the present label distribution, for the language model to provide even 21% performance on complete for top-1 and 33% for top-5 is quite good.

It is noted that pretraining the third conventional code related language model was performed by feeding the model the logical lines of 5 million programs—so at the minimum, some fine tuning for the code context where the function call is to be predicted is needed. As stated earlier, three different training conditions were contrasted:

complete: where the model was given text starting from the call, backwards, as shown in FIG. 4;

slice: where a backwards slice was used as shown in FIG. 5; and combined: where the text from complete and slice were concatenated as input to the model using a separator token.

The test was on complete text, or combined. These conditions were chosen because it was observed from examples that for the problem of code generation, data flow is not sufficient by itself. FIG. 9 shows such an example. FIG. 9 shows a code snippet where local text can help prediction, in accordance with an example embodiment. In this code, lines 5 and 15 contain the clue needed to make the prediction of id, but they are unrelated to the receiver for which the call is being made on line 22. Yet, the local pattern of code has the same variable names, and the same set of calls are repeated across functions, suggesting that id may be a good candidate label. FIG. 10 shows code where data flow lacks sufficient context, in accordance with an example embodiment. By contrast, the corresponding slice contains minimal information as shown in FIG. 10, since the receiver projects[0] was defined just within the function test_offset_limit_mimic.

Figures 12, 13:
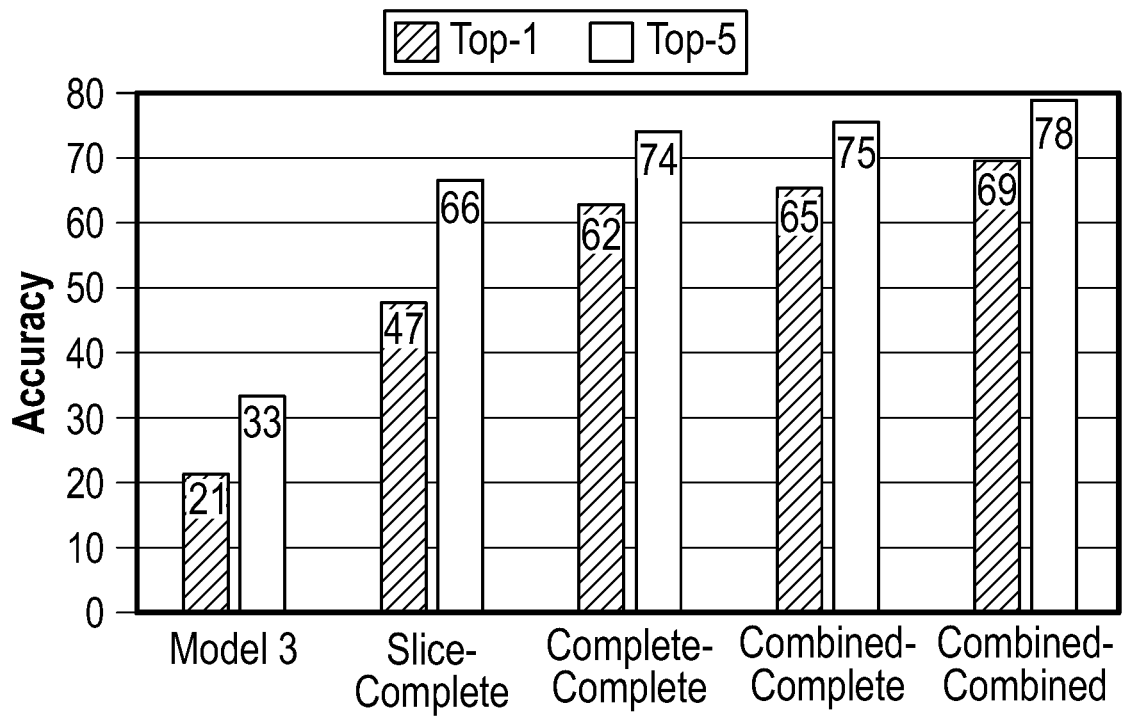
FIG. 12 shows an example where dataflow is very focused, in accordance with an example embodiment.
FIG. 13 shows the results of fine tuning on the different "training-testing" conditions (i.e., training on {slice, complete or combined} and tested on {complete or combined}), in accordance with an example embodiment.

FIG. 11 shows an example where complete text may have text relevant to the prediction, but distant from call site, in accordance with an example embodiment. It is noted, however, that sometimes the slice can help even when the truncation does not cut off key information for prediction. FIG. 11 shows one such example. The predicted function is partial that is imported in line 3, but the actual call is on line 28. FIG. 12 shows an example where dataflow is very focused, in accordance with an example embodiment. On the other hand, in FIG. 12, the import is the only call prior to the line, so the slice can make relevant information proximal, such that the neural model can pay greater attention to proximal elements of the code.

Model Details

The third conventional code related language model, which has 24 layers with 16 attention heads and 1024 hidden units, and was pretrained on 4M unique PYTHON files on GitHub. At fine-tuning, the batch size was set to 10 and the model was trained using 8 Tesla V100 graphical processing units (GPUs) with 32 GB memory. The learning rate is $5\times10^{-5}$, and the learning rate was gradually warmed up for the first 300 gradient updates, which are the default values provided by a known library. The training stops after 20 epochs, or ends after the evaluation accuracy hasn't improved for three epochs. For the complete and slice models, the 512 tokens model was used, and when combined was used, the 1024 tokens model was used, such that the exact same tokens present in complete and slice could be used together along with the separator.

Tokenization of the third conventional code related language model was applied to PYTHON programs in the benchmark dataset, where the PYTHON programs were first tokenized using the standard PYTHON tokenizer (the tokenize module). Then the program tokens were further broken down into 49,558 subwords using subword tokenization, as performed by the tokenizer of the third conventional code related language model.

Results of Fine Tuning

FIG. 13 shows the results of fine tuning on the different "training-testing" conditions (i.e., training on {slice, complete or combined} and tested on {complete or combined}), in accordance with an example embodiment. FIG. 13 shows the accuracy in predicting the function call exactly across the different training and test conditions. As shown in FIG. 13, training on slice was at 47% accuracy when tested on the complete text (slice-complete), which is significantly above the 21% of top-1 baseline from the third conventional code related language model. Training on complete however was much better at 62% on the same text (complete-complete), which is not surprising given that inspection of examples (e.g., FIG. 9) show that complete often contains the expressions in slice when the dataflow is local, and furthermore, benefits from repetition in coding patterns that might hint at labels in the absence of any real connection. The key question is whether slices provide any benefit over and above what benefit is gained from complete. Training on combined suggests that slices do provide a strong signal, with a 65% accuracy on complete text (combined-complete), and 69% accuracy on the combined text (combined-combined). Top-5 performance was also compared across conditions to allow comparison to the baseline language models—this result improved accuracy across all conditions, with the combined-combined condition showing the best performance at 78%. The results show that data flow analysis can significantly augment code completion performance.

Mechanism by which Slices Help Code Completion

Figure 14:
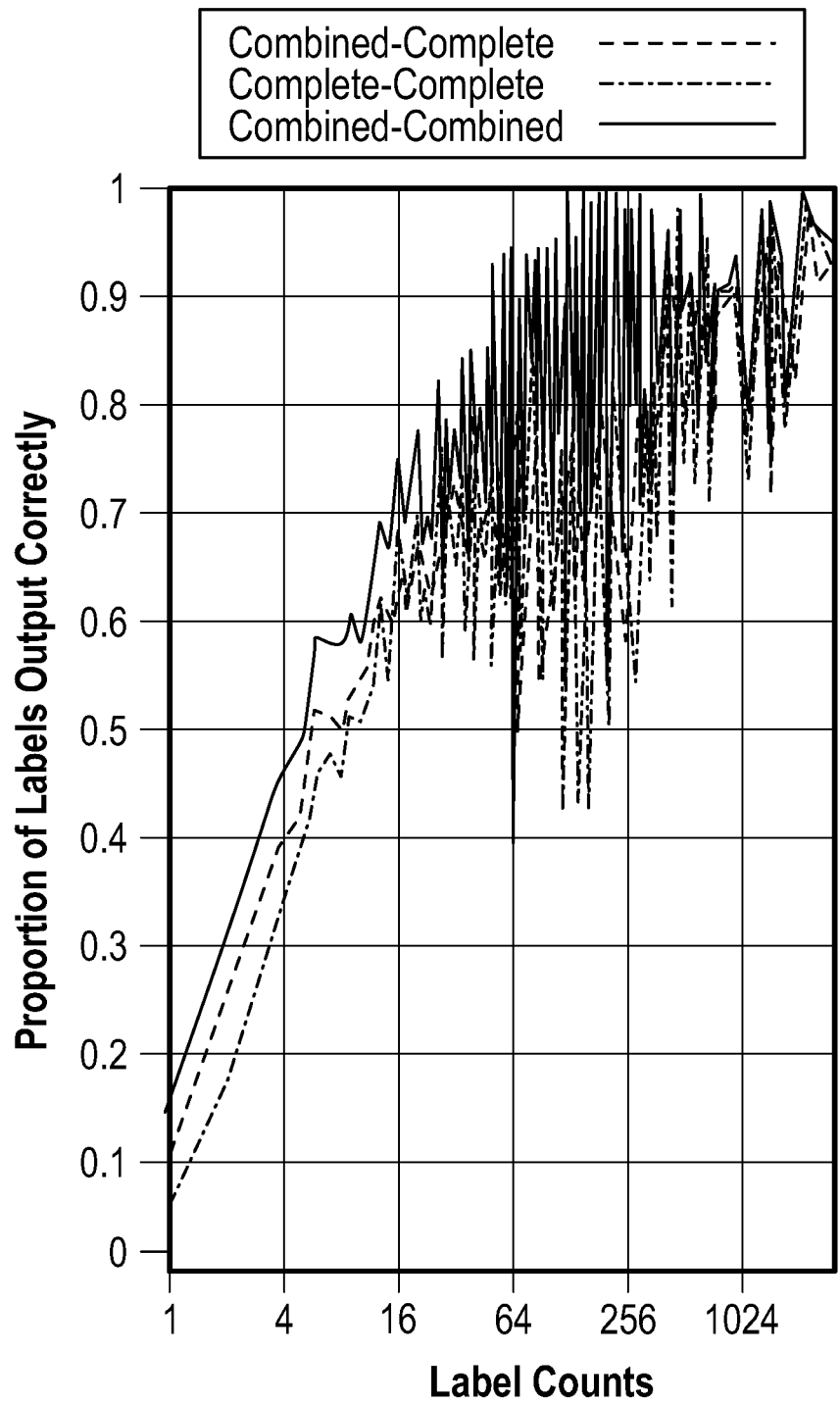
FIG. 14 is a graph of accuracy on labels with different counts, in accordance with an example embodiment.

An analysis was conducted regarding how slices might help code completion performance; i.e., to understand if slices help the model complete code better for rare labels as compared to more common ones, since statistical approaches likely work better for common labels, but less well for rare ones. FIG. 14 is a graph of accuracy on labels with different counts, in accordance with an example embodiment. FIG. 14 shows the performance of the different models; the presence of slices at training and test enhance code completion performance for rare labels more than common labels, although the advantage does seem to be present for common ones as well. The combined-combined model was 15% accurate on labels with count 1, of about 18,000 labels, and that number rapidly approaches 40% for labels with count 3. As labels become more frequent, the differences between the models get noisier but the combined-combined case still holds an advantage.

We have found that adding slice data to local context greatly aided the accuracy of the disclosed models. Other approaches also rely on mostly local information, and could potentially benefit from slices as well.

Example Implementation

As described above, code tends to be non-local, and so, completion of code using contiguous pieces of textual representations of code is less likely to cover the real use cases for code completion. For example, for X.something, what methods does it have? What fields does it have? Is X defined locally or somewhere else? Were things assigned to X in different places?

State of the art solutions (e.g., known integrated development environments) use code as tokens or AST representations of code (decorated with types) for code completion. When data flow is added, it is based on a local analysis of variables within a localized scope. In addition, newer conventional systems use machine learning that trains on a corpus of programs.

The use of only a local analysis of variables, for example, often results in inaccurate suggestions for the autocompletion of code. In one example embodiment, large scale inter-procedural data flow analysis that works on millions of programs is performed and data flow graphs are used to generate code completion. The incorporation of the disclosed data flow analysis technique enables the analysis of variables and other aspects of code both locally and non-locally. Focusing on inter-procedural data flow ensures that non-local dependencies are captured across programs. For example, the training of a language prediction model (such as a natural language prediction model, a code-specific language prediction model, and the like) by inputting a trimmed data flow graph and a trimmed node enables the incorporation of the disclosed data flow analysis technique in the autocompletion process. The disclosed technique abstracts away variable names and the like, and captures flow that is more semantic rather than syntactic (for example, where is "X" used and what was assigned to it.)

Sample Code and Corresponding Data Flow

Figure 15A:
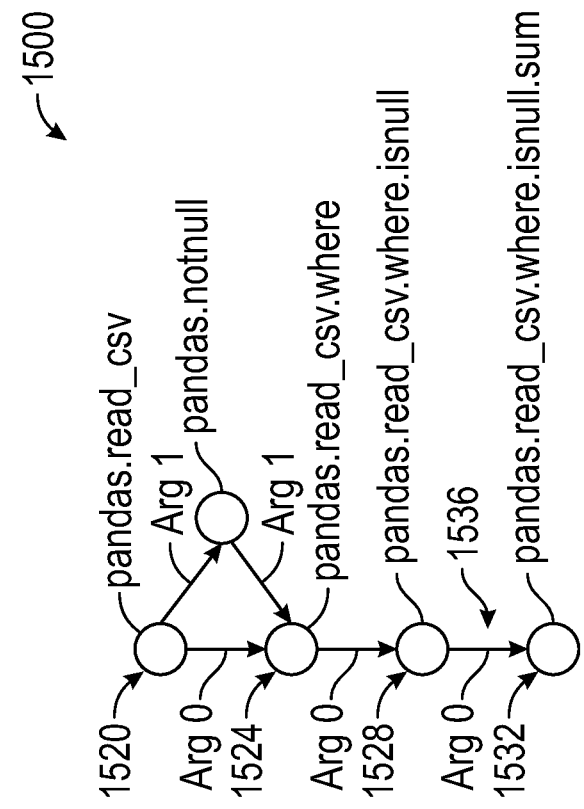
FIG. 15A illustrates a first example of non-locality of code.
Figure 16A:
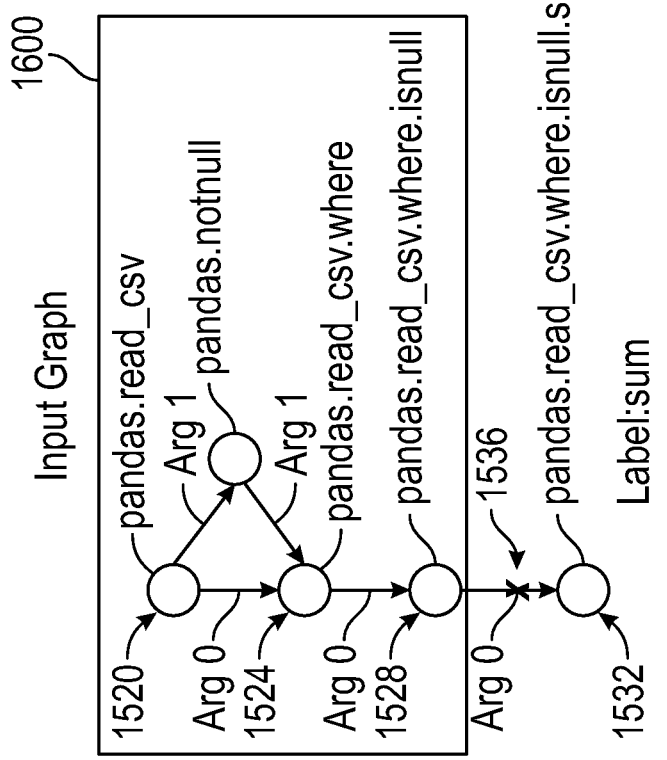
FIG. 16A illustrates an example of trimming an edge to a node (in the graph of FIG. 15A) that represents the method invocation to be predicted, in accordance with an example embodiment.

FIG. 15A illustrates a first example of non-locality of code. Two snippets of code are illustrated: line 66 and lines 184-185 (which may not be in the same method or function as line 66). One example task is to predict sum( ). The context for the actual prediction is often spread out across the entire program; in one or more embodiments, even an AST representation is too local. While the solution of inter-procedural analysis is expensive due to scaling and the complexity of tracking data flow, the use of a data flow graph can be very helpful in tracking. As illustrated in FIG. 15A, node 1520 of the graph 1500 represents the line 66 code snippet, node 1524 represents line 184, node 1528 represents line 185, and node 1532 represents the sum. FIG. 16A illustrates an example 1600 of trimming an edge 1536 to a node 1532 (in the graph 1500 of FIG. 15A) that represents the method invocation to be predicted, in accordance with an example embodiment.

Figure 15B:
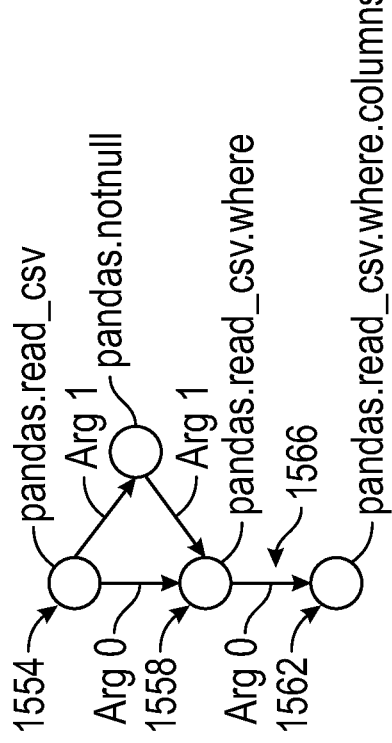
FIG. 15B illustrates a second example of non-locality of code.
Figure 16B:
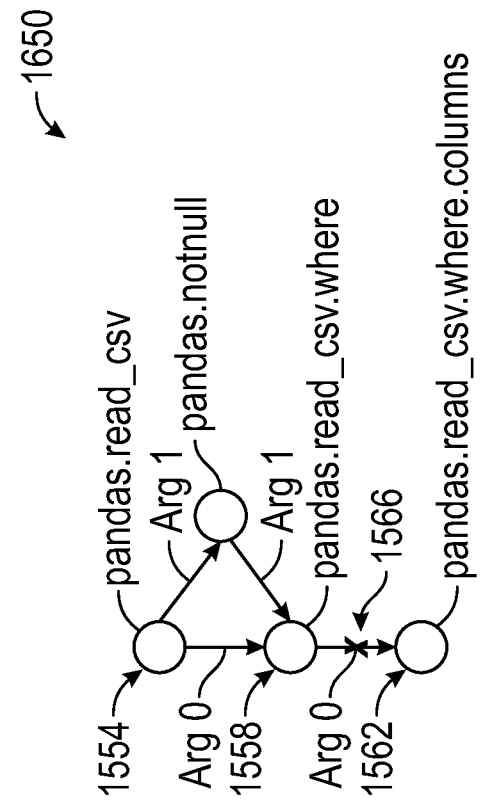
FIG. 16B illustrates an example of trimming an edge to a node (in the graph of FIG. 15B) that includes the parameter to be predicted, in accordance with an example embodiment.

FIG. 15B illustrates a second example of non-locality of code. Two snippets of code are illustrated. One example task is to predict "columns." As noted above, the context for the actual prediction is often spread out across the entire program. As illustrated in graph 1550 of FIG. 15B, there are nodes 1554, 1558, 1562 and edge 1566, and nodes 1558, 1562 of the graph 1550 represent the lower code snippet. FIG. 16B illustrates an example 1650 of trimming an edge 1566 to a node 1562 (in the graph 1550 of FIG. 15B) that includes the parameter to be predicted, in accordance with an example embodiment.

Figure 17:
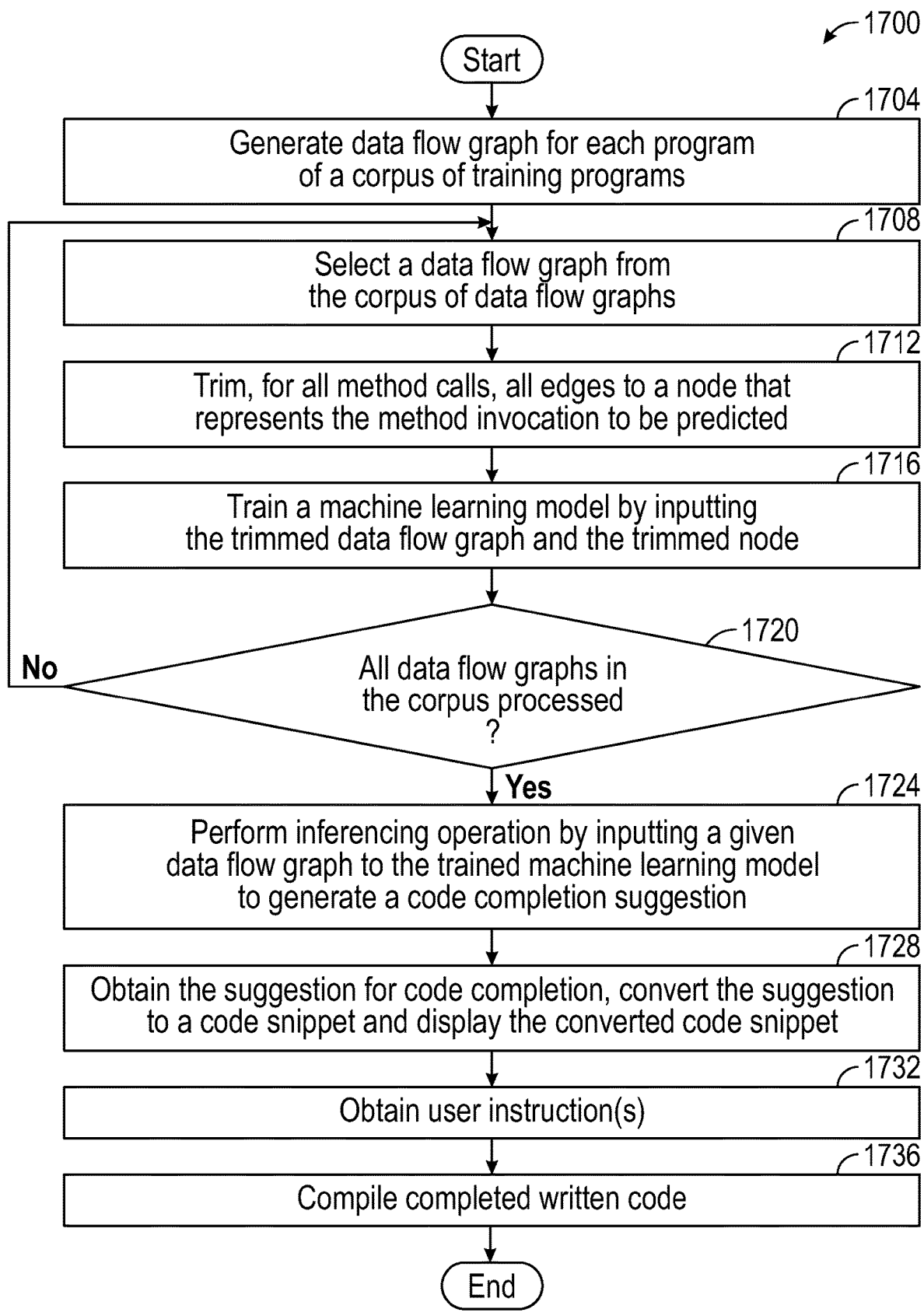
FIG. 17 is a method for generating code completion suggestions, in accordance with an example embodiment.

FIG. 17 is a method 1700 for generating code completion suggestions, in accordance with an example embodiment. In one example embodiment, data flow graphs 1500 are generated for each program of a corpus of training programs (operation 1704). (It is noted that, as in the case of the architecture of a compiler, a mapping of the source code to elements of each data flow graph (e.g., 1500) is maintained to support additional features.) A data flow graph 1500 is selected from the corpus of data flow graphs 1500 (operation 1708). For method calls, all edges 1536 to the node 1532 that represents the method invocation to be predicted are trimmed (operation 1712). For example, all edges 1536 to the node 1532 that represents the method invocation ".sum( )" are trimmed. In one example embodiment, a plurality of data flow graphs are generated for each program of the corpus of training programs by iteratively trimming nodes. The machine learning model is trained by inputting the trimmed data flow graph 1600 and the trimmed node 1532 (operation 1716). (In one example embodiment, the models are neural networks and the training is performed using a known forward and back propagation technique on a general purpose computer or other implementation (e.g., non-Von Neumann, hardware based, or the like) as discussed elsewhere herein.) A check is performed to determine if all the data flow graphs 1500 have been processed (operation 1720). If all data flow graphs 1500 have not been processed (NO branch), operations 1708 to 1716 are repeated; otherwise (YES branch), an inferencing operation is performed by inputting a given data flow graph 1600 to the machine learning model to generate a suggestion for code completion of the given data flow graph 1600 (operation 1724). In one example embodiment, a data flow graph 1600 for the entire program being analyzed is input. In one example embodiment, only the portion of the data flow graph 1600 closest to the suggestion point is input. For example, an arbitrary subgraph of the data flow graph 1600 may be input for analysis, program slicing or a similar technique may be used to identify the relevant portion of the data flow graph 1600 to be submitted for analysis, and the like. The suggestion for code completion is obtained from the machine learning model, converted to the corresponding code snippet, and displayed to a user (operation 1728). In one example embodiment, the machine learning model provides a set of candidate suggestions for code completion. In one example embodiment, the set of candidate suggestions for code completion are provided in a ranked format by the machine learning model.

In one example embodiment, the full set of candidate suggestions are simultaneously displayed to the user. In one example embodiment, the full set candidate suggestions are ranked and the highest ranked suggestions are simultaneously and/or sequentially presented to the user during operation 1728. The ranking may be based, for example, on 1) the frequency of a particular suggestion being selected by a variety of users during past autocompletion activities, 2) past selections or programming activities of the user being presented with the suggestion, 3) sorted alphabetically based on code localization, 4) frequency of occurrence of the candidate suggestion in the present source code, and the like. The ranking may also be based on the performance of a fuzzy match between the data flow graphs corresponding to the candidate suggestions and the given data flow graph; that is, the candidate suggestions that correspond to the training graphs that most closely match the given data flow graph may be ranked highest. In one example embodiment, the conversion of the corresponding code snippet converts a representation of the code snippet provided by the machine learning model into a code snippet that conforms to rules of a given compiler. This is facilitated by the source code-to-graph mapping generated during operation 1704. In one example embodiment, the machine learning model is trained to predict a code snippet that conforms to the rules of the given compiler and no conversion operation is needed.

An instruction(s) of a user, such as a confirmation of the suggestion, a selection of a suggestion from a list of suggestions, or a change to the suggestion, is obtained and used to complete the code (operation 1732). The completion of the code may be performed using standard compiler code generation techniques, using a parser/text processor, and the like. In one example embodiment, the user's decision is fed back for use in the training of the model using known techniques. Once the writing of the code is complete, the code is compiled and run (operation 1736).

In one example embodiment, neural network models are used to build a representation of the program data flow graph (such as serializing the graph, using graph neural networks, and the like) for use in training the classification model, and the classification model is used to model the code completion task. (This can be extended to a ranking task as well.) The program data flow graphs 1600 may be generated using known procedural analysis and inter-procedural analysis techniques.

In one example embodiment, the corpus of training programs is replaced by generating an abstraction of the generated data flow graph 1500. The abstraction may be performed by, for example, replacing variable names with a symbolic name. In general, the data flow graph 1500 is genericized. During inferencing, an abstraction of the given data flow graph 1500 may be similarly generated prior to performance of the inferencing operation. FIG. 18 shows an example of two similar data flow graphs. A given data flow graph may be fuzzily similar to a plurality of data flow graphs in the training corpus. A "gold standard" is therefore defined for ranking the corpus of training programs by seeing how different graphs lead to different method calls and the results are ranked based on, for example, the frequency of calling each method. (Similarity metrics across graphs are used to 'fuzzily match' the data flow graphs 1600 and to generate the rankings.)

Given the discussion thus far, it will be appreciated that, in general terms, an exemplary method, according to an aspect of the invention, includes the operations of accessing, using a hardware processor, a corpus of source code from a code database (operation 1704); training, using the hardware processor, a language prediction model based on the corpus of source code (operation 1716); accessing, using the hardware processor, a given program (operation 1724); predicting, using the hardware processor, a completion of a given line of the given program by performing inferencing using the (trained) language prediction model and at least a portion of the given program (operation 1724); and completing, using the hardware processor, the given line based upon the prediction (operation 1728). Accessing the corpus can be implemented, for example, by simply reading from a suitable data structure (e.g., file system). Accessing the program can also be implemented, for example, by simply reading from a suitable data structure (e.g., file system). The accessed code can then be parsed using a parser, and a graph can then be constructed from the parsed code using data flow techniques. In some cases, for example, autocompletion can be implemented via parsing/text processing to substitute the completed line into the code; standard compiler code generation techniques could also be employed.

In one example embodiment, the training of the language prediction model is performed by inputting a trimmed data flow graph 1600 and a trimmed node 1532.

In one example embodiment, the predicting of the completion of the given line further comprises converting a representation of a code snippet to an actual code snippet that conforms to rules of a given compiler (operation 1728).

In one example embodiment, the completed code is rendered into machine-executable form (e.g., compiled, interpreted) and the machine-executable code (e.g., compiled or interpreted code) is run (operation 1736).

In one example embodiment, the predicting operation predicts a plurality of completions of the given line and the method further comprises ranking the predicted completions.

In one example embodiment, a data flow graph 1500 is generated for each of a plurality of programs in the corpus of source code (operation 1704) and all edges 1536 to a node 1532 that represents a method invocation to be predicted are trimmed to generate a trimmed data flow graph 1600 (operation 1712).

In one example embodiment, the trimming operation is repeated to generate additional trimmed data flow graphs 1600.

In one example embodiment, the training operation is performed by inputting the trimmed data flow graph 1600 and the trimmed node 1532 (operation 1716).

In one example embodiment, an abstraction of the generated data flow graph 1500 is generated, the trimming edges 1536 operation is performed on the abstraction of the generated data flow graph 1500 (operation 1712) and the training is based on the trimmed abstracted data flow graph 1500.

In one aspect, a computer readable medium comprises computer executable instructions which when executed by a computer cause the computer to perform the method of accessing a corpus of source code from a code database (operation 1704); training a language prediction model based on the corpus of source code (operation 1716); accessing a given program (operation 1724); predicting a completion of a given line of the given program by performing inferencing using the language prediction model and at least a portion of the given program (operation 1724); and completing the given line based upon the prediction (operation 1728).

In one aspect, an apparatus comprises a memory and at least one processor, coupled to the memory, and operative to perform operations comprising accessing a corpus of source code from a code database (operation 1704); training a language prediction model based on the corpus of source code (operation 1716); accessing a given program (operation 1724); predicting a completion of a given line of the given program by performing inferencing using the language prediction model and at least a portion of the given program (operation 1724); and completing the given line based upon the prediction (operation 1728).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Refer now to FIG. 19.

Computing environment 100 contains an example of an environment for the execution of at least some of the computer code involved in performing the inventive methods, such as method 1700 for the autocompletion of software code, as seen at 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 19. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments of the invention, or elements thereof, can thus be implemented in the form of an apparatus including a memory and at least one processor that is coupled to the memory and operative to perform exemplary method steps. FIG. 19 depicts a computer system that may be useful in implementing one or more aspects and/or elements of the invention. Thus, aspects of the invention can be implemented, for example, using custom-written software on a general-purpose computer (e.g., using digital processing and a typical Von Neumann architecture); hardware processors such as GPUs can be employed in some instances. Some embodiments could also make use of hardware-based solutions, in-memory computing, non-Von Neumann architectures, analog calculations, etc., for machine learning/artificial intelligence aspects.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating computer code, the method comprising:
    accessing, using a hardware processor, a corpus of source code from a code database;
    training, using the hardware processor, a language prediction model based on the corpus of source code, wherein the training of the language prediction model is performed by inputting a trimmed data flow graph;

accessing, using the hardware processor, a given program;

predicting, using the hardware processor, a completion of a given line of the given program by performing inferencing using the language prediction model and at least a portion of the given program; and completing, using the hardware processor, the given line based upon the prediction.

2. The method of claim 1, wherein the training of the language prediction model is performed by inputting a trimmed node.

3. The method of claim 1, wherein the predicting of the completion of the given line further comprises converting a representation of a code snippet to an actual code snippet that conforms to rules of a given compiler.

4. The method of claim 1, further comprising rendering the completed code into machine-executable form and running the machine-executable code.

5. The method of claim 1, wherein the predicting operation predicts a plurality of completions of the given line and the method further comprising ranking the predicted completions.

6. The method of claim 1, further comprising:

generating a data flow graph for each of a plurality of programs in the corpus of source code; and trimming all edges to a node that represents a method invocation to be predicted, to generate the trimmed data flow graph.

7. The method of claim 6, further comprising iteratively repeating the trimming operation to generate additional trimmed data flow graphs.

8. The method of claim 6, wherein the training operation is performed by inputting the trimmed data flow graph and the trimmed node.

9. The method of claim 6, further comprising generating an abstraction of the generated data flow graph, wherein the trimming of the edges is performed on the abstraction of the generated data flow graph and wherein the training is based on the trimmed abstracted data flow graph.

10. A computer readable medium comprising computer executable instructions which when executed by a computer cause the computer to perform the method of:

accessing a corpus of source code from a code database;

training a language prediction model based on the corpus of source code, wherein the training of the language prediction model is performed by inputting a trimmed data flow graph;

accessing a given program;

predicting a completion of a given line of the given program by performing inferencing using the language prediction model and at least a portion of the given program; and completing the given line based upon the prediction.

11. The computer readable medium of claim 10, the method further comprising:

generating a data flow graph for each of a plurality of programs in the corpus of source code; and trimming all edges to a node that represents a method invocation to be predicted to generate the trimmed data flow graph, wherein the training operation is performed by inputting the trimmed data flow graph and the trimmed node.

12. An apparatus comprising:

a memory; and at least one processor, coupled to said memory, and operative to perform operations comprising:

accessing a corpus of source code from a code database;

training a language prediction model based on the corpus of source code, wherein the training of the language prediction model is performed by inputting a trimmed data flow graph;

accessing a given program;

predicting a completion of a given line of the given program by performing inferencing using the language prediction model and at least a portion of the given program; and completing the given line based upon the prediction.

13. The apparatus of claim 12, wherein the at least one processor is operative to train the language prediction model by inputting a trimmed node.

14. The apparatus of claim 12, wherein the at least one processor is operative to predict the completion of the given line by converting a representation of a code snippet to an actual code snippet that conforms to rules of a given compiler.

15. The apparatus of claim 12, wherein the at least one processor is further operative to render the completed code into machine-executable form and run the machine-executable code.

16. The apparatus of claim 12, wherein the at least one processor is operative to predict a plurality of completions of the given line and wherein the at least one processor is further operative to rank the predicted completions.

17. The apparatus of claim 12, wherein the at least one processor is further operative to:

generate a data flow graph for each of a plurality of programs in the corpus of source code; and trim all edges to a node that represents a method invocation to be predicted to generate the trimmed data flow graph.

18. The apparatus of claim 17, wherein the at least one processor is further operative to iteratively repeat the trimming operation to generate additional trimmed data flow graphs.

19. The apparatus of claim 17, wherein the at least one processor is operative to train the language prediction model by inputting the trimmed data flow graph and the trimmed node.

20. The apparatus of claim 17, wherein the at least one processor is further operative to generate an abstraction of the generated data flow graph, and wherein the at least one processor is operative to trim the edges by performing the trimming on the abstraction of the generated data flow graph and to train the language prediction model based on the trimmed abstracted data flow graph.

* * * * *